Figure 1:
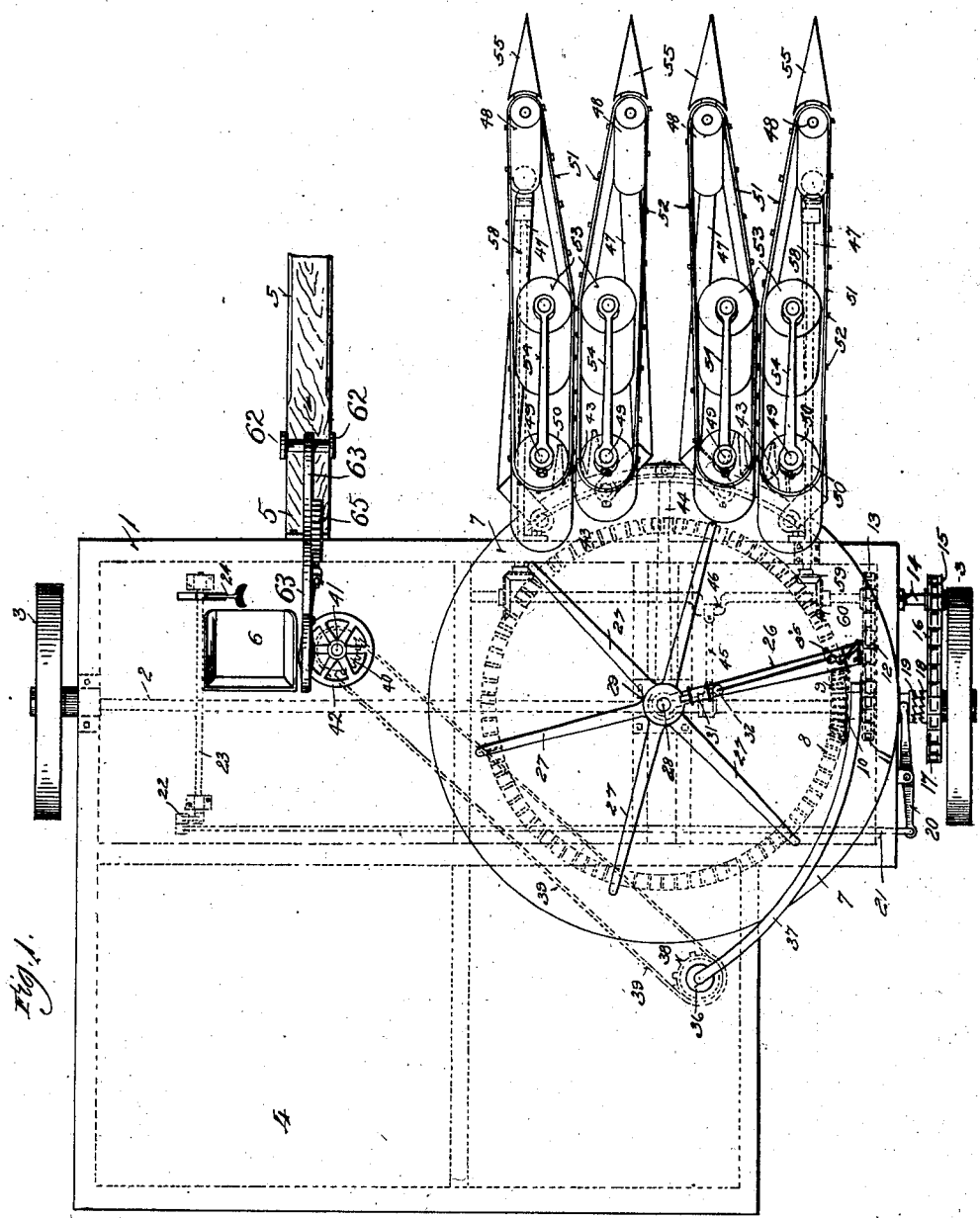

No. 751,367. PATENTED FEB. 2, 1904.
S. C. ANDERSON.
CORN HARVESTER.
APPLICATION FILED DEC. 30, 1901.
NO MODEL. 3 SHEETS—SHEET 1.

WITNESSES:
J. C. Dawley
Will O'Laughlin

INVENTOR.
Samuel C. Anderson
BY
ATTORNEY.

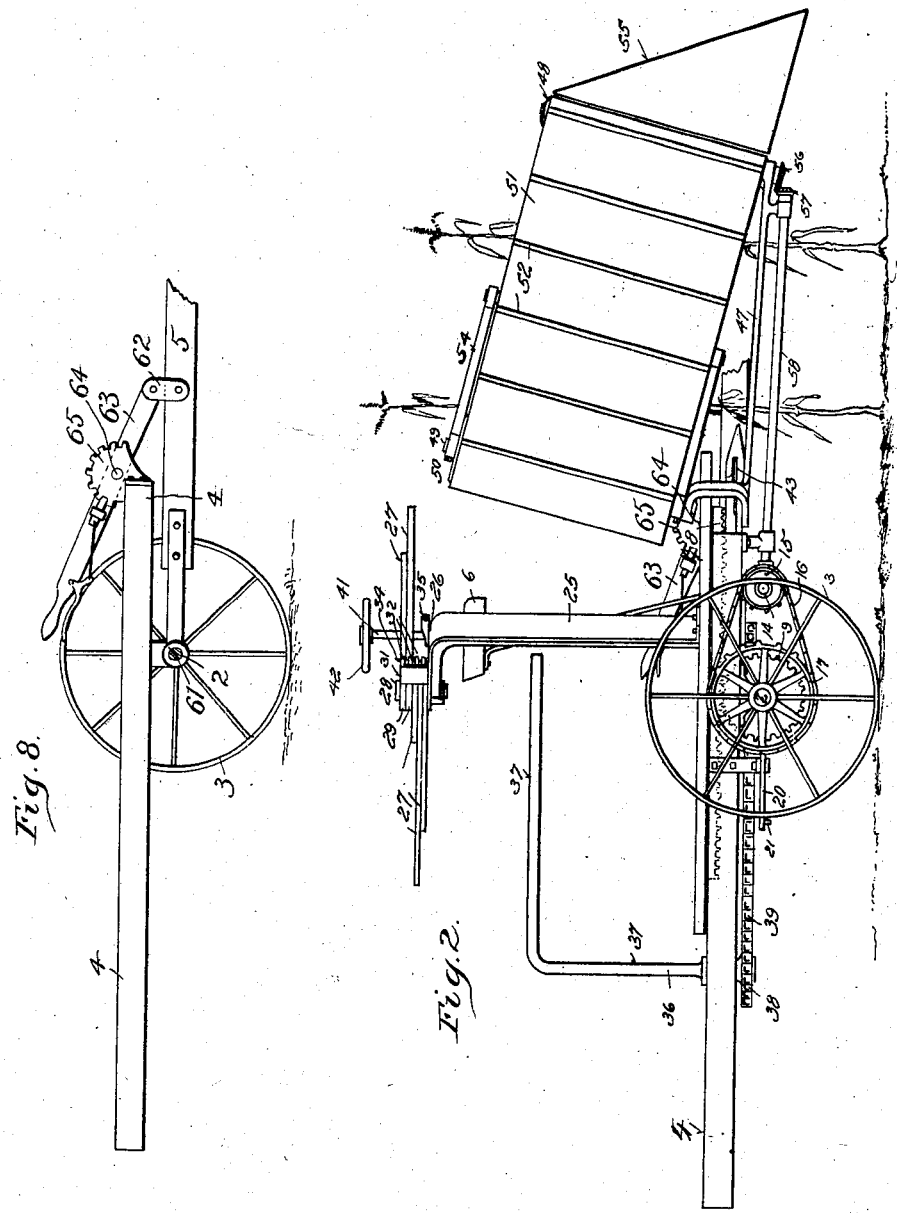

No. 751,367. PATENTED FEB. 2, 1904.
S. C. ANDERSON.
CORN HARVESTER.
APPLICATION FILED DEC. 30, 1901.
NO MODEL. 3 SHEETS—SHEET 3.
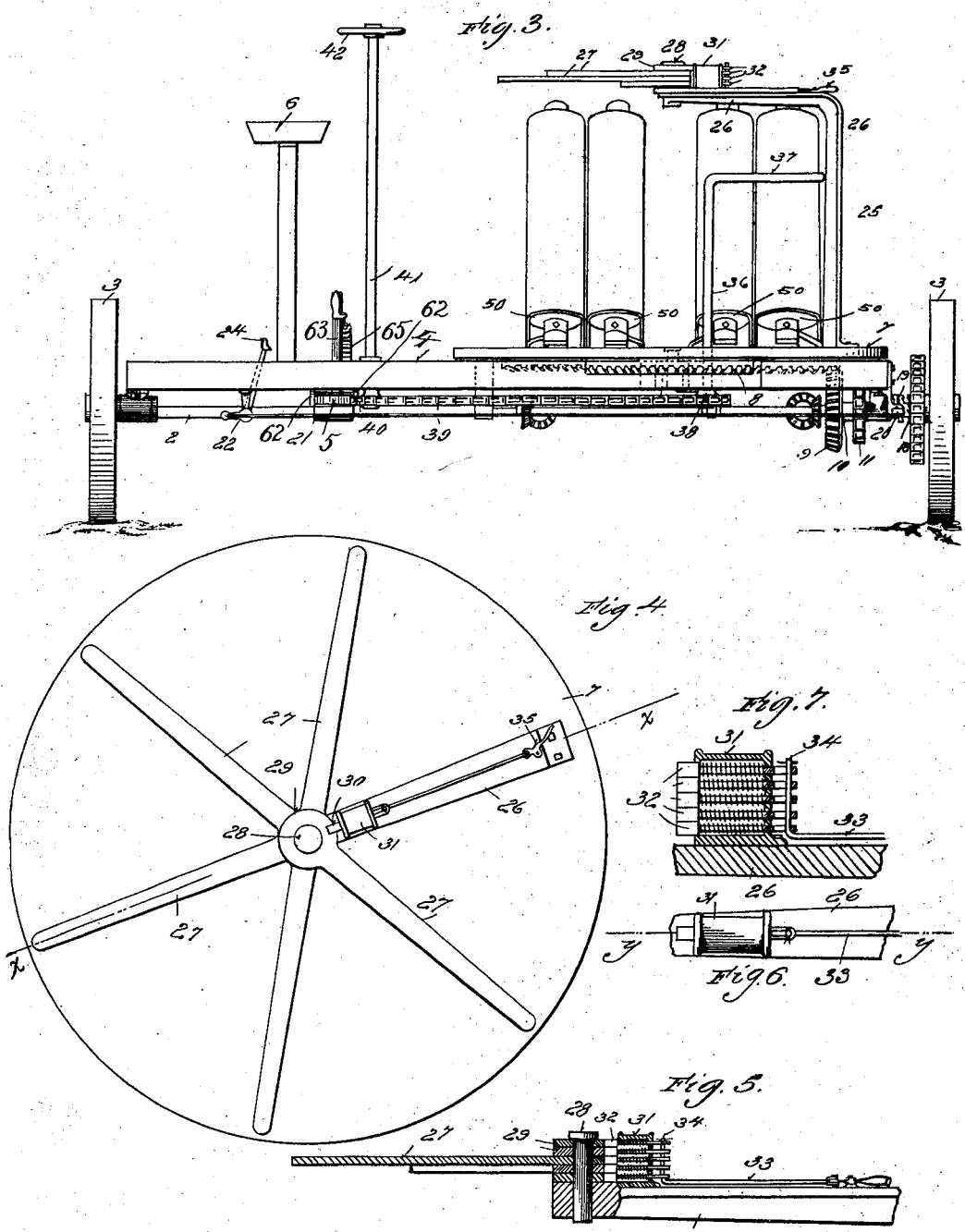

No. 751,367. Patented February 2, 1904.

UNITED STATES PATENT OFFICE.

SAMUEL COLLINS ANDERSON, OF XENIA, OHIO.

CORN-HARVESTER.

SPECIFICATION forming part of Letters Patent No. 751,367, dated February 2, 1904.

Application filed December 30, 1901. Serial No. 87,654. (No model.)

*To all whom it may concern:*

Be it known that I, SAMUEL COLLINS ANDERSON, a citizen of the United States, residing at Xenia, in the county of Greene and State of Ohio, have invented certain new and useful Improvements in Corn-Harvesters, of which the following is a specification, reference being had therein to the accompanying drawings.

This invention relates to corn-harvesters, and has for its object to provide a machine whereby the standing corn may be cut and the stalks gathered into a bundle or shock and after being tied delivered from the machine.

To these ends my invention consists in certain novel features, which I will now proceed to describe and will then particularly point out in the claims.

In the accompanying drawings, Figure 1 is a plan view of a machine embodying my invention in one form. Fig. 2 is a side elevation of the same. Fig. 3 is a rear elevation. Fig. 4 is a detailed plan view, on an enlarged scale, of the shocking-platform and arms. Fig. 5 is a detail sectional view taken on the line $xx$ of Fig. 4. Fig. 6 is a detail plan view, on an enlarged scale, of the latch. Fig. 7 is a detail sectional view taken on the line $yy$ of Fig. 6; and Fig. 8 is a sectional view taken on the line $zz$ of Fig. 1 and looking in the direction of the arrows, the seat and vertical shaft 41 being omitted.

In said drawings, 1 indicates a suitable platform supported on a transverse axle 2, having a ground-wheel 3 at each end. This axle and its wheels are located nearer to the front than to the rear of the platform for the purpose hereinafter specified, the platform having a rearward extension 4. This platform has secured to it the tongue or draft-pole 5 and has mounted on it the driver's seat 6, these latter being located at one side of the central line of the machine, as shown. On the other side of the machine there is located a revolving table or platform 7, which constitutes the shocking-platform. This platform is driven by means of a gear 8 on its under side, which meshes with a pinion 9, carried by a sleeve 10, having a sprocket-wheel 11, said sleeve and sprocket-wheel being loosely mounted on the axle. A sprocket-chain 12 passes around the wheel 11 and around a sprocket-wheel 13 on a shaft 14, mounted in suitable bearings on the under side of the main frame or platform 1. This shaft 14 is provided with a sprocket-wheel 15, around which passes a sprocket-chain 16, which also passes around a sprocket-wheel 17, loosely mounted on the axle 2. This latter sprocket-wheel carries a clutch member 18, which is adapted to be engaged by a corresponding clutch member 19, splined on the main axle, so as to rotate therewith. The clutch member 19 is controlled by a lever 20, connected by a rod 21 with an arm 22 on a rock-shaft 23, mounted under the platform 1 adjacent to the driver's seat and provided with a lever 24, by means of which it may be conveniently operated by the driver.

A standard 25 is located on one side of the rotary platform 7 and extends up above the same to a suitable height, being provided with a horizontal arm 26, which extends over the platform 7 to the center thereof. There are pivotally mounted on the end of this arm a plurality of radial arms 27, which are held in their normal radial position by means of a suitable locking mechanism, but which when released are free to swing. The construction which I prefer for that purpose is that shown, in which the arm 26 is provided with a pivot pin or bolt 28, on which the arms 27 are pivotally mounted one above the other. Each arm 27 has a circular hub 29, provided with a notch 30, and there is mounted on the arm 26 a keeper 31, in which are a number of spring-actuated bolts 32, one for each arm 27. These locking-bolts normally engage the notches 30 and hold the arms 27 stationary in a position such that they diverge from each other and from the arm 26 at about equal angles, as shown. The bolts 32 are operated by a rod 33, which has an upturned end 34, passing through slots in the shanks of all of the bolts, and this rod 33 is in turn operated by a hand-lever 35, mounted on the arm 26, or by means of any other suitable operating mechanism.

At the rear of the platform 7 there is mounted a vertical shaft 36, carrying a horizontal arm 37, which extends over the platform 7, being, preferably, somewhat curved, as shown.

This shaft 36 is provided with a sprocket-wheel 38, around which passes a sprocket-chain 39, which also passes around a sprocket-wheel 40 on the lower end of the vertical shaft 41, located adjacent to the driver's seat and provided with a hand-wheel 42 or other suitable means for rotating said shaft. If deemed desirable or necessary, the sprocket-wheel 38 may be made of greater diameter than the sprocket-wheel 40 in order to provide sufficient power to enable the arm 37 to properly accomplish its functions, hereinafter pointed out.

At the front of the rotary platform 7, at each side thereof, are located cutters 43, two sets of cutters being employed, so that the machine is adapted to operate upon two rows of corn at the same time. The cutters 43 are driven by an arm of a bell-crank lever 44, loosely pivoted on the axis of the table 7 and having a vibratory motion imparted to it by having its other arm connected with a pitman 45, which is in turn connected with a crank 46 on the shaft 14. The standing corn is carried to these cutters and delivered to the platform 7 after being cut by means of combined guiding and feeding devices located in pairs over each cutter. Each pair consists of two similar members, each comprising an arm 47, extending forward from the frame and having mounted thereon at its front end an inclined roller 48, while at its rear end there is mounted a correspondingly-inclined fixed spindle 49, carrying a similar roller 50. An endless apron 51, of canvas or other suitable flexible material, extends around these rollers 48 and 50, the same being preferably provided with transverse ribs or slats 52, as shown. Each apron is held taut and forced toward the other one of the pair by means of a third roller 53, mounted within the apron on spring-arms 54, secured to the spindle 49 and serving by their elasticity to force the rollers 51 toward each other, thus causing the aprons to grip the cornstalks and at the same time maintain a proper tension. At the front of each member there is mounted on the arm 47 an inclined tapering guard or shield 55 to insure the proper reception of the standing stalks between the rearwardly-converging front portions of the aprons and to lift and straighten any stalks which may not be upright. I have shown one apron of each pair as being driven by means of a bevel-pinion 56, connected with the front roller 48 and meshing with a bevel-pinion 57 on a shaft 58, extending rearward underneath the arm 47 and provided at its rear end with a bevel-pinion 59, which meshes with a corresponding bevel-pinion 60 on the shaft 14. It is obvious, however, that both aprons of each pair may be similarly positively driven, if desired. It will be noted that the aprons extend rearward over the rotary platform 7 in such a manner as to deliver the severed stalks thereon after they have passed the cutters.

The machine thus organized operates in the following manner: Being driven through the field, with the clutch members 18 and 19 in engagement with each other, it operates upon two rows of corn at once, the stalks of each row being engaged between the corresponding pair of aprons and being carried rearward thereby in an upright position to the cutters. After being severed the stalks are still carried rearward in an upright position by the aprons and delivered in this position on the rotating shocking-platform, between the arms 27 of which they are held upright, their butts resting on the platform. As the spaces between the arms 27 are filled the platform is rotated, so as to present fresh spaces between the succeeding arms until all the spaces are filled with standing stalks and sufficient material has accumulated on the platform to form a shock. This shock is then bound in any suitable manner, and the locking-bolts are disengaged from the notches in the hubs of the arms 27, leaving these latter free to swing around their pivot. The arm 37 is then operated by means of the mechanism provided for that purpose, which can be done by the driver without leaving his seat. As the arm 37 sweeps across the platform it removes the shock from said platform, the arm 27 being free to swing in the direction of the movement of the shock to permit this removal. The shock is removed laterally and rearward and passes on to the rear extension 4 of the main platform 1. Since this latter platform is supported on two wheels only, one at each side and near the front of the machine, the weight of the shock on the rearward extension will cause the platform to tend to tilt, whereby the shock will either be discharged automatically or else its removal will be greatly facilitated. This tilting is accomplished by reason of the fact that the tongue 5 is pivotally connected to the axle 2, as indicated at 61, and is connected in front of the platform 1 by means of links 62 to a lever 63, pivoted at 64 to a bracket 65 of the forward edge of the platform and provided with any suitable locking means, such as that shown. The arms 27 and 37 are then brought back into position and the machine again started to cut and form another shock. When it is desired to move the machine without actuating the mechanism thereof, the clutch members 18 and 19 are disengaged, whereupon the platform 7 and cutting, gathering, and conveying mechanisms remain stationary.

I do not wish to be understood as limiting myself strictly to the precise details hereinbefore pointed out and shown in the accompanying drawings, as it is obvious that these details may be modified without departing from the principle of my invention.

Having thus fully described my invention, what I claim as new, and desire to secure by Letters Patent, is—

1. In a corn-harvester, the combination, with cutting mechanism, of a rotary shocking-platform located in the rear thereof, a plurality of stalk-supporting arms pivotally supported above said platform, and means for locking said arms in radially-spaced positions relatively to the platform and to each other, the space between said arms and the platform being free and unobstructed, and said arms being free, when released, to swing independently in the direction of movement of the shock as it is being discharged, substantially as described.

2. In a corn-harvester, the combination, with cutting mechanism, of a rotary shocking-platform located in the rear thereof, a standard arising from said platform near the margin thereof and having an arm at its upper end extending to a point above the center of the platform, a plurality of stalk-supporting arms pivotally mounted on the inner end of said arm, and means for locking said arms in radially-spaced positions relatively to the platform and to each other, said arms being free, when released, to swing independently in the direction of movement of the shock as it is being discharged, substantially as described.

3. In a corn-harvester, the combination, with cutting mechanism, of a rotary shocking-platform located in the rear thereof, a standard arising from said platform near the margin thereof and having at its top a horizontal arm extending to a point above the center of the platform and provided at its inner end with a pivot pin or bolt, stalk-supporting arms having notched hubs pivotally mounted on said pivot pin or bolt, locking-bolts for engaging the notches of said hubs to lock said arms in radially-spaced positions relatively to the platform and to each other, and means for operating said locking-bolts to release said arms, substantially as described.

4. In a corn-harvester, the combination, with cutting mechanism, of a rotary shocking-platform located in the rear thereof, a plurality of stalk-supporting arms pivotally supported above said platform, means for locking said arms in radially-spaced positions relatively to the platform and to each other, the space between said arms and the platform being free and unobstructed, and said arms being free, when released, to swing independently in the direction of movement of the shock as it is being discharged, a discharge-arm pivotally mounted adjacent to the platform and adapted to sweep over the same to discharge the shock, and means for operating said discharge-arm, substantially as described.

5. In a corn-harvester, the combination, with cutting mechanism, of a rotary shocking-platform located in the rear thereof, a plurality of stalk-supporting arms pivotally supported above said platform, means for locking said arms in radially-spaced positions relatively to the platform and to each other, the space between said arms and the platform being free and unobstructed, and said arms being free, when released, to swing independently in the direction of movement of the shock as it is being discharged, a discharge-arm pivotally mounted adjacent to the platform and adapted to sweep over the same to discharge the shock, and means for operating said discharge-arm, said means comprising an operating-shaft located adjacent to the driver's seat, and connecting mechanism between said operating-shaft and the discharge-arm, substantially as described.

6. In a corn-harvester, the combination, with cutting mechanism and a rotary shocking-platform located in the rear thereof, of stalk gathering and conveying mechanism comprising rearwardly-moving endless aprons having their adjacent faces in vertical planes and adapted to grasp the stalks between them, both of said aprons extending from a point forward of the cutters upward and rearward past the cutters and over and beyond the front or receiving edge of the rotary platform, substantially as described.

7. In a corn-harvester, the combination, with cutting mechanism and a rotary shocking-platform located in the rear thereof, of stalk gathering and conveying mechanism comprising two rearwardly-traveling aprons, inclined rearward and upward, their forward working portions converging rearwardly and their rearward working portions being held toward each other by spring-pressure and extending rearward past the cutters and over the front or receiving portion of the shocking-platform, substantially as described.

8. In a corn-harvester, the combination, with a rotary shocking-platform, of cutting mechanisms located at each side of the front thereof, and a stalk gathering and conveying mechanism for each cutting mechanism, each comprising two forwardly-extending arms having forwardly-inclined rollers mounted thereon, the rear rollers being higher than the front and being located in the rear of the cutting mechanism and above the shocking-platform, an endless apron passing around said rollers and provided with transverse slats, a spring-supported roller for pressing the central portion of each apron toward the adjacent apron, whereby the forward portions of the aprons are caused to converge, an inclined tapering guard or shield in front of each apron, and means for positively driving one of said rollers to impart a rearward motion to the opposite faces of the aprons, substantially as described.

9. In a corn-harvester, the combination, with a main platform supported on two wheels at opposite sides thereof, and provided with a rearward extension, of a rotary shocking-platform located at one side of the front of the main platform, a discharge-arm adapted to sweep across said shocking-platform to remove the shock therefrom, and means for operating said discharge-arm, whereby the shock is discharged from the rotary platform rearwardly and laterally onto the rearward extension of the main platform, which latter is adapted to be tilted thereby, substantially as described.

In testimony whereof I affix my signature in presence of two witnesses.

SAMUEL COLLINS ANDERSON.

Witnesses:
E. D. SMITH,
R. L. GOUDY.